(12) United States Patent
Nachenberg et al.

(10) Patent No.: US 8,312,539 B1
(45) Date of Patent: Nov. 13, 2012

(54) USER-ASSISTED SECURITY SYSTEM

(75) Inventors: Carey S. Nachenberg, Northridge, CA (US); Rowan Trollope, Woodland Hills, CA (US)

(73) Assignee: Symantec Corporation, Mountain View, CA (US)

( * ) Notice: Subject to any disclaimer, the term of this patent is extended or adjusted under 35 U.S.C. 154(b) by 640 days.

(21) Appl. No.: 12/172,046

(22) Filed: Jul. 11, 2008

(51) Int. Cl.
*G06F 11/00* (2006.01)
*G06F 11/30* (2006.01)
*G06F 3/048* (2006.01)

(52) U.S. Cl. .............. 726/22; 726/23; 726/24; 713/188; 715/808

(58) Field of Classification Search .................... 726/11, 726/22–25; 713/164–167, 187–189; 715/808
See application file for complete search history.

(56) References Cited

U.S. PATENT DOCUMENTS

| | | | |
|---|---|---|---|
| 6,088,803 A | 7/2000 | Tso et al. | |
| 6,108,799 A * | 8/2000 | Boulay et al. | 714/38.13 |
| 6,968,507 B2 * | 11/2005 | Pennell et al. | 715/781 |
| 7,197,539 B1 | 3/2007 | Cooley | |
| 7,412,516 B1 | 8/2008 | Brown et al. | |
| 7,448,084 B1 | 11/2008 | Apap et al. | |
| 7,546,349 B1 | 6/2009 | Cooley | |
| 7,559,086 B2 | 7/2009 | Sobko et al. | |
| 7,571,483 B1 * | 8/2009 | Bascle et al. | 726/24 |
| 7,587,367 B2 | 9/2009 | Mengerink | |
| 7,594,272 B1 | 9/2009 | Kennedy et al. | |
| 7,712,132 B1 * | 5/2010 | Ogilvie | 726/22 |
| 7,783,741 B2 | 8/2010 | Hardt | |
| 7,831,840 B1 * | 11/2010 | Love et al. | 713/189 |
| 7,870,608 B2 | 1/2011 | Shraim et al. | |
| 8,019,689 B1 | 9/2011 | Nachenberg | |
| 2002/0046041 A1 | 4/2002 | Lang | |
| 2002/0194490 A1 | 12/2002 | Halperin et al. | |
| 2003/0167308 A1 | 9/2003 | Schran | |
| 2003/0177394 A1 * | 9/2003 | Dozortsev | 713/201 |
| 2004/0054661 A1 | 3/2004 | Cheung | |
| 2004/0205354 A1 * | 10/2004 | Gabriel et al. | 713/200 |
| 2004/0215977 A1 * | 10/2004 | Goodman et al. | 713/201 |

(Continued)

FOREIGN PATENT DOCUMENTS

EP 1971102 9/2008

OTHER PUBLICATIONS

"Stopzilla," http://www.stopzilla.com/info/home.aspx, retrieved from the Internet Archive WayBackMachine http://web.archive.org, indexed Jul. 1, 2007.*

(Continued)

*Primary Examiner* — Darren B Schwartz
(74) *Attorney, Agent, or Firm* — Fenwick & West LLP (57) ABSTRACT

A user-assisted security software program alerts a user when a new pop-up is displayed from a suspicious source application. If the source application may be suspicious if it has a low reputation. Displayed in connection with the pop-up, the alert prompts the user to indicate whether the source application that generated the pop-up should be trusted. If the user indicates that the source application is not trusted, the security software declares the source application to be malicious. The malicious code can then be dealt with, such as by removing it from the computing system, blocking it from generating new pop-ups, and preventing further network communications. The user's feedback about the source application may also be used to adjust the application's reputation.

26 Claims, 3 Drawing Sheets

U.S. PATENT DOCUMENTS

| | | | |
|---|---|---|---|
| 2005/0039082 A1 | 2/2005 | Nachenberg | |
| 2005/0050335 A1 | 3/2005 | Liang et al. | |
| 2005/0060581 A1* | 3/2005 | Chebolu et al. | 713/201 |
| 2005/0066290 A1* | 3/2005 | Chebolu et al. | 715/808 |
| 2005/0120238 A1* | 6/2005 | Choi | 713/200 |
| 2005/0182924 A1* | 8/2005 | Sauve et al. | 713/154 |
| 2005/0268090 A1 | 12/2005 | Saw et al. | |
| 2005/0283837 A1 | 12/2005 | Olivier et al. | |
| 2006/0026123 A1 | 2/2006 | Moore et al. | |
| 2006/0048225 A1* | 3/2006 | Gomez et al. | 726/22 |
| 2006/0085328 A1 | 4/2006 | Cohen et al. | |
| 2006/0212270 A1 | 9/2006 | Shiu et al. | |
| 2006/0212925 A1 | 9/2006 | Shull et al. | |
| 2006/0212930 A1 | 9/2006 | Shull et al. | |
| 2006/0212931 A1 | 9/2006 | Shull et al. | |
| 2006/0230039 A1 | 10/2006 | Shull et al. | |
| 2006/0253458 A1 | 11/2006 | Dixon et al. | |
| 2006/0253581 A1 | 11/2006 | Dixon et al. | |
| 2006/0253583 A1 | 11/2006 | Dixon et al. | |
| 2006/0253584 A1 | 11/2006 | Dixon et al. | |
| 2006/0277469 A1* | 12/2006 | Chaudhri et al. | 715/709 |
| 2007/0011739 A1 | 1/2007 | Zamir et al. | |
| 2007/0050444 A1 | 3/2007 | Costea et al. | |
| 2007/0107053 A1 | 5/2007 | Shraim et al. | |
| 2007/0124579 A1 | 5/2007 | Haller | |
| 2007/0143629 A1 | 6/2007 | Hardjono et al. | |
| 2007/0156886 A1 | 7/2007 | Srivastava | |
| 2007/0162349 A1 | 7/2007 | Silver | |
| 2007/0174911 A1* | 7/2007 | Kronenberg et al. | 726/22 |
| 2007/0192855 A1 | 8/2007 | Hulten et al. | |
| 2007/0233782 A1 | 10/2007 | Tali | |
| 2007/0256133 A1* | 11/2007 | Garbow et al. | 726/26 |
| 2008/0005223 A1 | 1/2008 | Flake et al. | |
| 2008/0028463 A1 | 1/2008 | Dagon et al. | |
| 2008/0046975 A1* | 2/2008 | Boss et al. | 726/4 |
| 2008/0082662 A1 | 4/2008 | Dandliker et al. | |
| 2008/0104180 A1 | 5/2008 | Gabe | |
| 2008/0109244 A1 | 5/2008 | Gupta | |
| 2008/0109473 A1 | 5/2008 | Dixon et al. | |
| 2008/0109491 A1 | 5/2008 | Gupta | |
| 2008/0114709 A1 | 5/2008 | Dixon et al. | |
| 2008/0133540 A1 | 6/2008 | Hubbard et al. | |
| 2008/0140442 A1 | 6/2008 | Warner | |
| 2008/0140820 A1 | 6/2008 | Snyder et al. | |
| 2008/0141366 A1 | 6/2008 | Cross et al. | |
| 2008/0189788 A1 | 8/2008 | Bahl | |
| 2009/0077664 A1* | 3/2009 | Hsu et al. | 726/24 |
| 2009/0125382 A1 | 5/2009 | Delepet | |
| 2009/0254993 A1 | 10/2009 | Leone | |
| 2009/0282476 A1 | 11/2009 | Nachenberg et al. | |
| 2009/0328209 A1 | 12/2009 | Nachenberg | |

OTHER PUBLICATIONS

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," In Proceedings of the 205 IEEE Symposium on Security and Privacy, IEEE Computer Society, 2005.

Delio, M., "Virus Throttle a Hopeful Defense", Wired News, Dec. 9, 2002 [online] Retrieved from the Internet <URL:http://www.wired.com/news/infostructure/0,1377,56753,000.html>.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

International Search Report and Written Opinion, PCT Application No. PCT/US09/48328, Dec. 22, 2010, 8 pages.

Kephart, J. et al., "Automatic Extraction of Computer Virus Signatures," 4th Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

Lowe, R. et al., WinXP Pro File Sharing, Practically Networked, Dec. 12, 2001, [online] [Retrieved on Jun. 10, 2003] Retrieved from the Internet <URL:http//www.practicallynetworked.com/sharing/xp.sub.—filesharing/w- hole.htm>.

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index.html>.

McGlohon, M. et al., "SNARE: A Link Analytic System for Graph Labeling and Risk Detection," Proceedings of the 15th ACM SIGKDD International Conference on Knowledge Discovery and Data mining, ACM, 2009, pp. 1265-1274, New York, N.Y.

Microsoft web pages, "Microsoft Palladium: A Business Overview," pp. 1-10 [online], Amy Carroll, Mario Juarez, Julia Polk and Tony Leininger, Aug. 2002 [retrieved on Oct. 10, 2002]. Retrieved from the Internet: <URL:http://www.microsoft.com/PressPass/features/2002/jul02/0724pallad-iumwp.asp>.

Microsoft web pages, "Microsoft Palladium Initiative—Technical FAQ," pp. 1-8 [online], Aug. 2002 [retrieved in Oct. 10, 2002]. Retrieved from the Internet: <URL:http://www.microsoft.com/technet/security/news/Pa11FAQ2- .asp?frame=true>.

Moore, D. et al., Code-Red: A Case Study on the Spread and Victims of an Internet Worm, Proceedings of the Internet Measurement Workshop (IMW), 2002, [online] [Retrieved on Dec. 16, 2003] Retrieved from the Internet <URL:http://www.citeseernj.nec.com/moore02codered.hmtl>.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

Neville, J. et al., "Collective Classification with Relational Dependency Networks," Workshop on Multi-Relational Data Mining (MRDM-2003), 2003.

New Windows Worms at Work in May web page, Shout Communications, [online] [Retrieved on Dec. 16, 2003] Retrieved from the Internet <URL:http://www.shoutasia.com/trend/clients.sub.—trend.sub.—may.sub.—virus.htm>.

Pandit, S. et al., "NetProbe: A Fast and Scalable System for Fraud Detection in Online Auction Networks," WWW '07, Proceedings of the 16th International Conference on World Wide Web, ACM, 2007, pp. 201-210, New York, N.Y.

Parkhouse, Jayne, "Pelican SafeTNet 2.0" [online], Jun. 2000, SC Magazine Product Review, [retrieved on Dec. 1, 2003]. Retrieved from the Internet: <URL:http://www.scmagazine.com/scmagazine/standalone/pelican/sc.sub.—pelican.html>.

Pei, J. et al., "On Mining Cross-Graph Quasi-Cliques," Proceedings of the Eleventh ACM SIGKDD International Conference on Knowledge Discovery in Data Mining, ACM, 2005, 11 pages.

Schultz, M. et al., "Data Mining Methods for Detection of New Malicious Executables," IEEE Symposium on Security and Privacy, IEEE Computer Society, 2001, pp. 38-49.

Siddiqui, M. et al., "A Survey of Data Mining Techniques for Malware Detection Using File Features," ACM-SE 46: Proceedings of the 46th Annual Southeast Regional Conference on XX, ACM, 2008, pp. 509-510, New York, N.Y.

Staniford, S. et al., How to Own the Internet in Your Spare Time, Proceedings of the 11the USENIX Security Symposium, 2002, [online] [Retrieved on Dec. 16, 2003] Retrieved from the Internet <URL://http://citeseer.nj.nec.com/staniford02how.html>.

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

Symantec Internet Security Threat Report, 36 pages, [Online] [Retrieved on Aug. 8, 2010] Retrieved from the Internet<URL:http:// eval.symantec.com/mktginfo/enterprise/white_papers/b-whitepaper_exec_summary_internet_security_threat_report_xiii_04_2008.en-us.pdf>.

Symantec Malware Definition, [Online] [Retrieved on Aug. 6, 2010] Retrieved from the Internet<URL:http://www.symantec.com/norton/security_response/malware.jsp>.

Symantec Norton Community Watch Privacy Policy, [Online] [Retrieved on Aug. 6, 2010] Retrieved from the Internet<URL:http://www.symantec.com/about/profile/policies/ncwprivacy.jsp>.

Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=2009070 6_02>.

Tesauro, G. et al., "Neural Networks for Computer Virus Recognition," IEEE Expert, 1996, pp. 5-6, vol. 11, No. 4.

Tong, H. et al., "Fast Best-Effort Pattern Matching in Large Attributed Graphs," Proceedings of the 13$^{th}$ ACM SIGKDD International Conference on Knowledge Discovery and Data Mining, ACM, 2007, 10 pages.

Toth, T. et al., Connection-History Based Anomaly Detection, Proceedings of the 2002 IEEE, Workshop on Information Assurance and Security, Jun. 2002, pp. 30-35. vol. 17-19, United States Military Academy, West Point, N.Y.

Trusted Computing Platform Alliance, "Building a Foundation of Trust in the PC," pp. 1-9, Jan. 2000.

Trusted Computing Platform Alliance web pages. "TCPA / Palladium Frequently Asked Questions," pp. 1-13 [online], Ross Anderson [retrieved on Oct. 10, 2002]. Retrieved from the Internet: <URL:http://www.cl.cam.ac.uk/.about.rja14/tcpa-faq.html>.

"TrustedSource™: The Next-Generation Reputation System White Paper," Secure Computing Corporation, Oct. 2006, 6 pages.

Tucek, J. et al., "Sweeper: a Lightweight End-to-end System for Defending Against Fast Worms", Jun. 2007, EuroSys '07: Proceedings of the 2nd ACM SIGOPS/EuroSys European Conference on Computer Systems 2007, Publisher: ACM, pp. 115-128.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

Walsh, K., "Fighting PeertoPeer SPAM and Decoys with Object Reputation," ACM, Aug. 22-26, 2005, pp. 1-6.

Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.

Weaver, N. et al., "A Taxonomy of Computer Worms," Proceedings of the 2003 ACM Workshop on Rapid Malcode, ACM, 2003, pp. 11-18, New York, N.Y.

Williamson, M., "Throttling Viruses: Restricting Propagation to Defeat Malicious Mobile Code", ACSAC Conference, Dec. 2002, pp. 1-9, Hewlett-Packard, Dec. 10, 2002.

Windows XP Simple File Sharing web page, Practically Networked, [online] [Retrieved on Jun. 10, 2003] Retrieved from the Internet <URL:http://www.practicallynetworked.com/sharing/xp/filesharing.htm>.

Yan, X. et al., "gSpan: Graph-Based Substructure Pattern Mining," Proceedings of the 2002 IEEE International Conference on Data Mining (ICDM '02), 2002, 4 pages.

Yan, X. et al., "Mining Closed Relational Graphs with Connectivity Constraints," Proceedings of the Eleventh ACM SIGKDD International Conference on Knowledge Discovery in Data Mining, ACM, 2005, p. 333.

Yedidia, J. et al., "Understanding Belief Propagation and Its Generalizations," Exploring Artificial Intelligence in the New Millennium, 2003, pp. 236-239, vol. 8.

Zeng, Z. et al., "Coherent Closed Quasi-Clique Discovery from Large Dense Graph Databases," Proceedings of the 12$^{th}$ ACM SIGKDD International Conference on Knowledge Discovery and Data Mining, ACM, 2006, 6 pages.

Zhu, X., "Semi-Supervised Learning with Graphs," 2005, 174 pages.

* cited by examiner

USER-ASSISTED SECURITY SYSTEM

BACKGROUND

This invention relates generally to security software, including antivirus and anti-spam software, and in particular to detecting malicious software and blocking unwanted visual displays using feedback from a user.

There are classes of malicious and/or annoying software programs (referred to herein collectively as malicious software or malicious code) that do not run silently. Rather, these programs cause the unwanted display of advertising pop-ups or other annoying user interface elements on the user's desktop. Examples of this type of malicious software include some adware programs and some downloaders. Traditional security software may fail to detect these types of malicious software for various reasons. For example, there has been a recent of server-size polymorphism, where an attacker polymorphs each threat on the server so each user receives a different executable threat. As a result, many threats and annoyances caused by malicious software may be missed by traditional antivirus and anti-spam detection methods used by security software.

When security software fails to detect and block malicious software that is causing the annoying or unwanted display of pop-ups, the security software is made to look particularly inept. This is because the failure of the security software is manifested in a visible display that is presented directly to the user. The experience may be particularly frustrating for users, since the security software is failing to catch and prevent pop-ups from malicious software, even though the existence of the malicious software is obvious to the user because the pop-ups are right in the user's face. This failure of the security software may be a significant driver causing users to change their security software.

Accordingly, what is needed is a mechanism to improve the detection and prevention of malicious software that generates unwanted pop-ups or other unwanted visible elements on a user's desktop.

SUMMARY

Embodiments of the invention incorporate a self-service mechanism that allows a user to make decisions about whether to squelch and/or remove visible malicious software on the user's machine. The self-service mechanism is triggered when potentially malicious software causes the display of a suspicious display element, such as a pop-up. The user may then provide input as to whether the display element is unwanted, allowing the security software to catch the malicious code that may have previously avoided detection. The self-service mechanism thus enables users to prevent malicious and annoying software even when other security software techniques (e.g., signatures, heuristics, or behavioral detection) have failed to catch the threat.

In various embodiments of the invention, a user-assisted security software program alerts a user when a new pop-up is displayed from a suspicious source application. In one embodiment, the security system provides the alert only if the source application is deemed suspicious, and determining whether an application is suspicious may be based on a reputation for the application, determined for example based on information from an online community of users. The security software displays the alert in connection with the pop-up. The alert prompts the user to indicate whether the source application that generated the pop-up should be trusted. If, in response to the alert, the user indicates that the source application is not trusted, the security software declares the source application to be malicious. The malicious code can then be dealt with, such as by removing it from the computing system, preventing it from generating new pop-ups, and/or preventing it from making further network communications. The user's feedback about the source application may also be used to adjust the application's reputation, either positively or negatively.

By determining whether the source application is suspicious before prompting the user for feedback about the pop-up, embodiments of the security software avoid unnecessarily bothering of users. This can be thought of as a kind of filtering out of low-risk threats based on the likelihood that a source application is malicious. In addition, by presenting the prompt in an alert at the same time as the pop-up in question, in accordance with an embodiment of the invention, the user is being prompted for feedback while the user is viewing the pop-up. In this way, the user is in a good position to make a decision about whether the source application that caused the pop-up is to be trusted.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
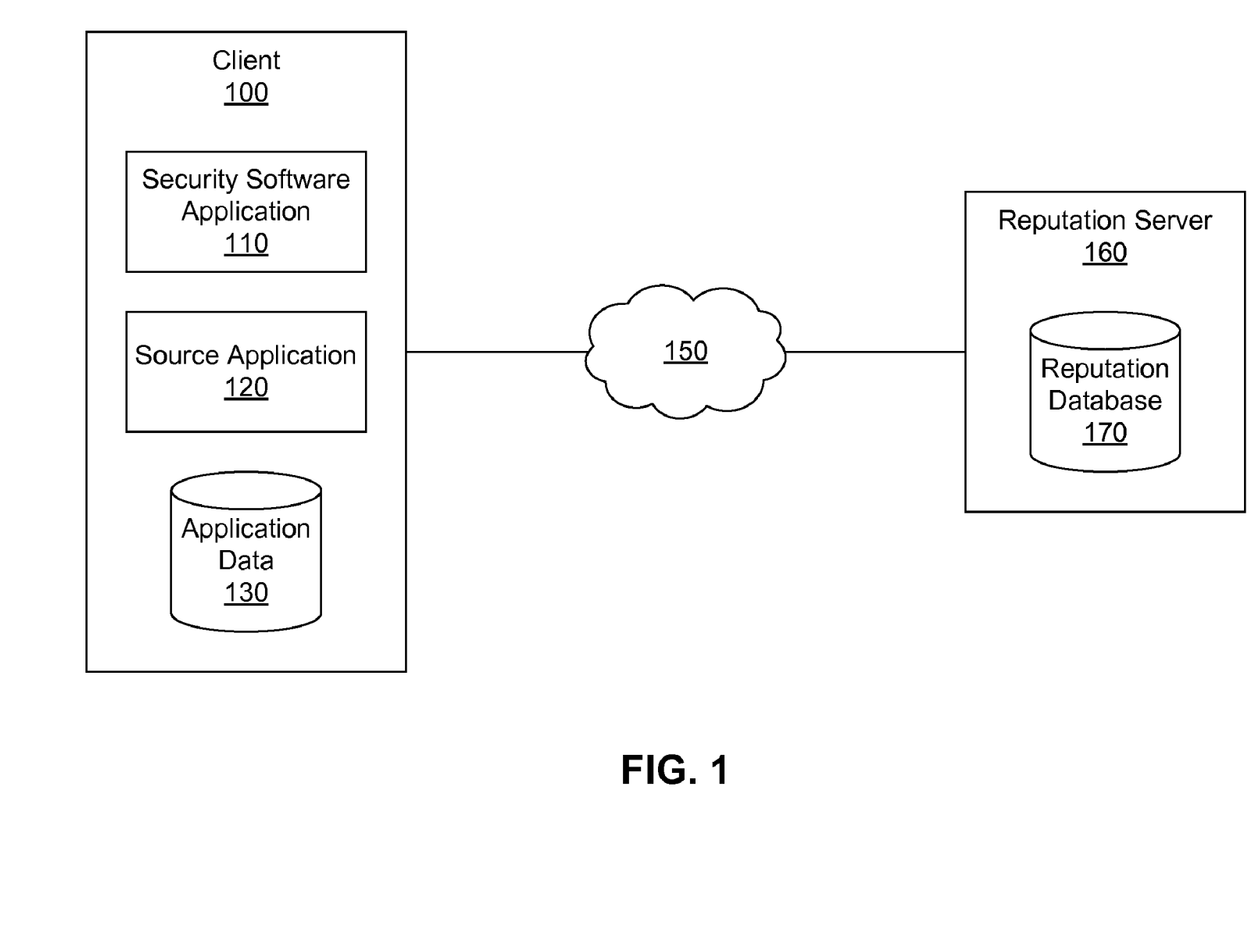
FIG. 1 is a diagram of a user-assisted security system, in accordance with an embodiment of the invention.

FIG. 1 illustrates a network diagram including a user-assisted security system for detecting and blocking malicious software on a client 100. In one embodiment, the client 100 is a computer used by one or more users to perform activities including downloading, installing, and/or executing files and browsing web sites on the network 150. The client 100, for example, can be a personal computer executing a web browser that allows the user to retrieve and display content from web servers and other computers over the network 150. In other embodiments, the client 100 is a network-capable device other than a computer, such as a personal digital assistant (PDA), a mobile telephone, a pager, a television "set-top box," or any other suitable computing device. For purposes of this description, the term "client" also includes computers such as servers and gateways that encounter files or other entities that might constitute malicious code or other threats. For example, the client 100 may be a network gateway located between an enterprise network and the Internet. The client 100 can also be a mail server or web server that stores files that can be accessed by other clients.

In one embodiment, the client 100 executes a security software application 110 that monitors the client 100. In an embodiment, the security software application 110 monitors processes running on the client 100 that may comprise malicious code. For example, the security software application 110 may monitor actions on the client 100 such as the calling of graphics functions to display items on a display of the client 100. In addition to the security software application 110, the client 100 also executes one or more other source applications 120. The source applications 120 may comprise any type of executable file, library (such as a DLL), or any other file on the client 100 that includes executable code. Each source application 120 may include code to cause a pop-up or other graphical element to be displayed by the client 100. The client 100 may further include application data 130, stored for example in a storage memory within or accessible by the client 100. The application data 130 includes information about one or more source applications 120 on the client 100, as described in more detail below.

The client 100 communicates over a network 150 with a reputation server 160. The reputation server 160 may also communicate with a number of other client computing systems over the network 150, for example, to maintain an online community of users for tracking the reputation of various applications and other software entities with which client computing systems may interact. U.S. application Ser. No. 11/618,215, filed Dec. 29, 2006, incorporated by reference in its entirety, describes methods and systems for computing hygiene scores for various client computing systems, where the hygiene scores represent assessments of the trustworthiness of the clients, and for computing a reputation score for an entity (e.g., a potential malicious software) using those client hygiene scores. In this context, a client's trustworthiness may refer to the client's propensity for getting infected by malicious code and other computer related threats, and/or the ability of the user to avoid the threats. The reputation score may represent an assessment of whether the entity is malicious, or how likely the entity contains malicious code.

Figure 2:
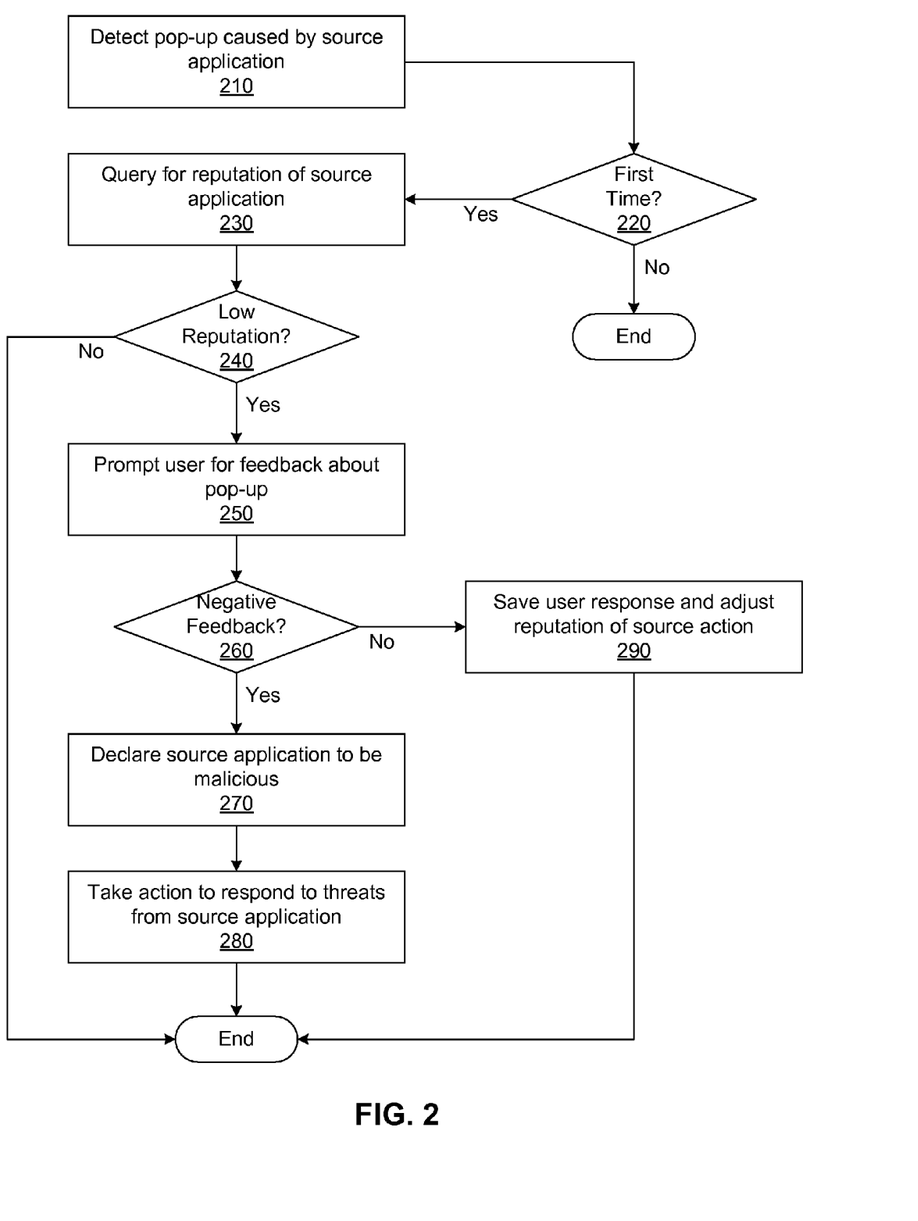
FIG. 2 is a flow chart of a process for detecting malicious software using input from a user, in accordance with an embodiment of the invention.

FIG. 2 illustrates a user-assisted process for detecting and dealing with malicious code that causes the display of unwanted items on a user's client 100. The operations described in FIG. 2 may be performed by the security software application 110 on the client 100; however, the actions need not be performed all by one entity or software module. Any combination of software modules may be used to implement the functionalities of the security software application 110, some of which may be executed by a system other than the client 100 in communication with the client 100.

While the client 100 is running, any number of functional code modules, in addition to the security software application 110, may be executed by the client 100. This code may include instructions to draw one or more objects on the display of the client 100. As used herein, software code that attempts to draw or draws an object on the display is called a source application 120, as it is the source of the display object.

Figure 3:
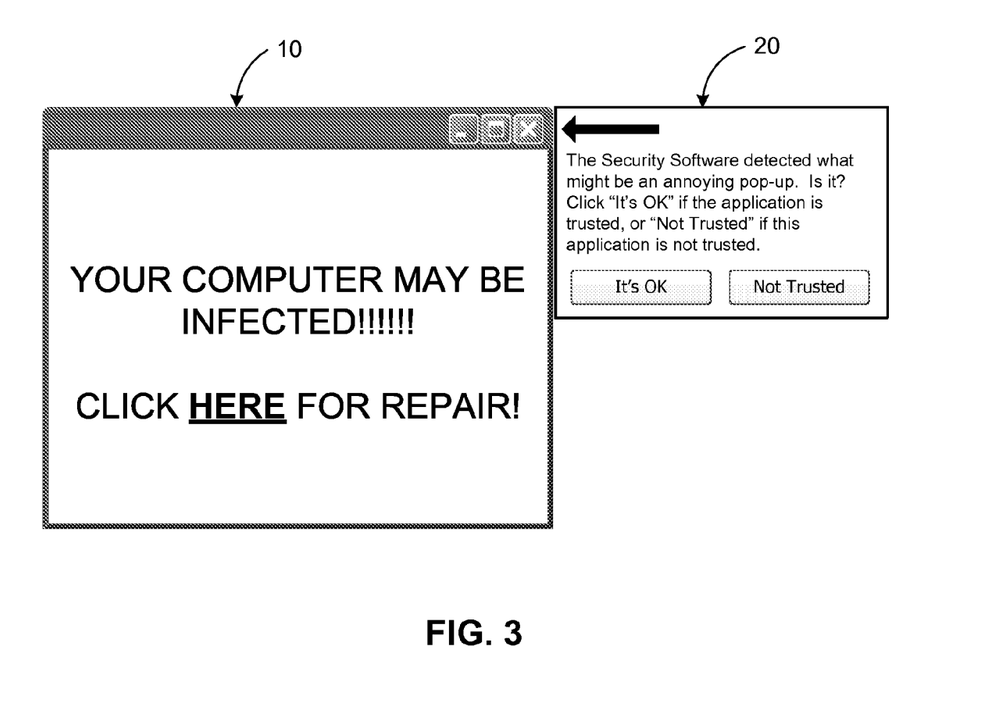
FIG. 3 is an example of a pop-up and an alert generated by the security software, in accordance with an embodiment of the invention.

In one embodiment, a source application causes a pop-up to be drawn on the display of the client 100. The pop-up may comprise a window that includes a message to the user, possibly with an active region such as a link or a button the will cause a further action to be performed. An example of such a pop-up is illustrated in FIG. 3, which shows a pop-up window 10 drawn on a display. The pop-up window 10 may be annoying to or otherwise unwanted by the user. In other embodiments, a source application 120 may draw other types of display objects on the display. For example, malicious code may display a picture or a message overlay on the display. Accordingly, as used herein, a "pop-up" may include any object, drawing, window, button, text, or other item that may be drawn on the client's display, or any graphics command that affects the display (e.g., a "melting" effect of the existing display screen).

The security software application 110 detects 210 the pop-up caused by the source application 120, noting the identity of the source application 120. If 220 this is the first time that the source application 120 is causing a pop-up to be displayed, the security software application 110 continues with the user-assisted detection process. If 220 this is not the first time, then the process has already been performed for the source application 120, and the security software application 110 will either allow or disallow the pop-up according to that prior determination. The security software application 110 may determine whether 220 this is the first time that the source application 120 is displaying a pop-up by accessing this information from the application data 130 on the client. The security software application 110 may also update the application data 130 to indicate that the source application 120 has now displayed a pop-up, so the process will not be performed again for subsequent pop-ups from the same source application 120.

Once the security software application determines that the user-assisted detection process should continue, it determines whether the source application 120 is sufficiently suspicious to alert the user. In one embodiment, the security software application 110 queries 230 for a measure of the reputation of the source application 230 from the reputation server 160, which responds to the security software application 110 by providing the requested information. The security software application 110 then determines whether 240 the reputation of the source application 120 is sufficiently low so that the source application 120 is suspicious. This determination may be performed many different ways, as desired, and based on empirical evidence that balances between the desire to avoid overly bothering users and the objective to catch (and not miss) malicious software. For example, the reputation may be based on the number of other users who trust or use the source application 120, a measure of hygiene of the users who trust or use the source application 120, and/or various other measures of reputation.

If 240 the reputation of the source application 120 is high enough that the source application 120 is not suspicious, the security software application 110 stops the detection process. In this way, the security software application 110 minimizes unnecessary hassle to the user in cases where there is a low likelihood that the source application 120 contains malicious code. The security software application 110 may further store this information in the application data 130, for example, to "white list" the source application 120 for future uses.

On the other hand, if 240 the reputation of the source application 120 is low enough so that it is suspicious, the security software application 110 prompts 250 the user for feedback about the pop-up. FIG. 3 illustrates an alert window 20 that is displayed next to a pop-up window 10 caused by the source application 120. As illustrated, the alert window 20 prompts the user to provide feedback about the pop-up window 10. This feedback may be provided via any of a number of user interface mechanisms, such as buttons in the example. Advantageously, displaying the alert window 20 next to the pop-up window, or otherwise visually associated with the pop-up, and at the same time, it is very clear to the user what feedback is being requested. The user can easily answer the prompt based on the user's opinion of the pop-up graphic in question.

The user's feedback about the pop-up can then be used as a proxy for whether the source application 120 itself should be trusted, or whether it contains malicious code. If 260 the user dos not provide negative feedback about the pop-up, the security software application 110 saves 270 the user's response. For example, the security software application 110 may update the application data 130 to indicate that the source application 120 should be trusted in the future. The user's positive feedback about the source application may also be used to update the reputation of that application. For example, the security software application 110 may forward that feedback to the reputation server 160, which may then update the reputation based on this additional information.

If 260 the user provided negative feedback about the pop-up, the security software application 110 declares 280 the source application 120 to be malicious software. This may be as innocent as an unwanted, annoying advertising application, or it may be a harmful computer virus. Regardless, the user has indicated that the source application 120 is causing unwanted pop-ups, so the security software application 110 takes 290 appropriate action in response to possible threats from the source application 120. The action taken may vary depending on the goal of the security software application 110. For example, the security software application 110 may remove the source application 120 from the client 100, or it may pass the source application 120 to an antivirus scanner to cleanse possible malicious code from the source application 120.

Alternatively, the security software application 110 may simply block the source application 120 from displaying future pop-ups. This may be desired when the threat from the malicious code is merely annoying advertising that is coupled with a useful application (e.g., in the case of adware as in kazaa), as it allows the useful application to be used while preventing the annoying pop-ups from it. Blocking the source application 120 may be accomplished by updating the application data 130 to indicate that the source application 120 should be blocked. When the source application subsequently attempts to display a pop-up, the security software application 110 may check the application data 130 (e.g., to implement step 220), and it will then see that the source application 120 should be prevented from displaying the pop-up.

In one embodiment, not only does the security software application 110 block attempts by the source application 120 to display further pop-ups, it blocks attempts by executable code that may be produced by the source application to display pop-ups. This prevents identified malicious code from avoiding the security system by merely dropping new modules of malicious code. Accordingly, the security software application may include a lineage tracking module to track code that comes from the identified malicious code and thereby block any executable code that came from the identified malicious code.

Beneficially, embodiments of the invention described herein enable the user to assist the security software in detecting and dealing with potential malicious code, which may be a computer virus or merely spam software that causes annoying pop-ups to be displayed on the user's machine. Whereas antivirus and/or anti-spam programs may fail to detect and remove threats from new malicious software, resulting in unwanted pop-ups and other display elements, embodiments of the invention enable users to remove the threats themselves. Since the user is making this decision while the user is directly observing the pop-up, the user is in a good position to determine whether the software application that causes the pop-up should be trusted. More particularly, the user can make a more educated decision about whether to trust the source application because the prompt from the security software is directly associated with the specific pop-up in question.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for detecting malicious code on a client, the method comprising:

detecting, using a computer, a pop-up displayed on the client by an executing source application;

determining, using the computer, a reputation associated with the source application;

when the reputation associated with the source application indicates that the source application is suspicious, prompting, using the computer, a user to provide feedback about the pop-up;

responsive to negative feedback about the pop-up, declaring, using the computer, the source application to be malicious software; and after declaring the source application to be malicious software:
- blocking, using the computer, a subsequent attempt by the executing source application to display a subsequent pop-up on the client;
- tracking, using the computer, executable code produced by the executing source application to identify one or more new code modules on the client as originating from the source application; and
- blocking, using the computer, attempts by the new code modules to display a new pop-up on the client.

2. The method of claim 1, wherein determining a reputation associated with the source application comprises querying a reputation server for a reputation score associated with the source application.

3. The method of claim 2, wherein the reputation score is based at least in part on interactions of a plurality of client systems in a community with the source application.

4. The method of claim 2, wherein the reputation score is based at least in part on hygiene scores of a plurality of client systems that use the source application, the hygiene scores indicating propensities of the clients using the source application for getting infected by malicious code.

5. The method of claim 1, wherein prompting a user to provide feedback about the pop-up comprises displaying an alert window simultaneously with the pop-up, the alert window comprising an interface for a user to provide positive or negative feedback about the pop-up.

6. The method of claim 1, further comprising:
after declaring the source application to be malicious software, removing the source application.

7. The method of claim 1, further comprising:
after declaring the source application to be malicious software, preventing the source application from conducting network communications.

8. The method of claim 1, further comprising:
adjusting the reputation of the source application in response to the feedback from the user.

9. The method of claim 1, further comprising:
responsive to positive feedback about the pop-up, storing an indication that the source application is trusted software.

10. A computer-implemented method for detecting malicious code on a client, the method comprising:
- detecting, using a computer, an attempt by a source application executing on the client to cause the client to display a visual element on a display of the client;
- determining, using the computer, whether the source application is suspicious;
- when the source application is determined to be suspicious, displaying, using the computer, an alert to a user requesting a user input indicating whether to block the source application from displaying visual elements on the display of the client;
- responsive to the user input indicating whether to block the source application, storing, using the computer, a preference based on the user input in a storage medium coupled to the client; and
- responsive to the preference identifying the source application as a blocked application:
  - blocking, using the computer, subsequent attempts by the executing source application to display subsequent visual elements on the display of the client;
  - tracking, using the computer, executable code produced by the executing source application to identify one or more new code modules on the client as originating from the source application; and
  - blocking, using the computer, attempts by the new code modules to display new visual elements on the display of the client.

11. The method of claim 10, wherein blocking subsequent attempts by the executing source application to display subsequent visual elements on the display of the client comprises:
- responsive to a subsequent attempt of the source application to cause the client to display a subsequent visual element on a display of the client, checking for the existence of a preference identifying the source application as a blocked application; and
- if the preference exists, preventing the display of the subsequent visual element.

12. The method of claim 10, wherein the visual element is a pop-up.

13. A computer program product for detecting malicious code on a client, the computer program product comprising a non-transitory computer-readable storage medium comprising computer program code executable by a processor for:
- detecting a pop-up displayed on the client by an executing source application;
- determining a reputation associated with the source application;
- when the reputation associated with the source application indicates that the source application is suspicious, prompting a user to provide feedback about the pop-up; and
- responsive to negative feedback about the pop-up, declaring the source application to be malicious software; and
- after declaring the source application to be malicious software:
  - blocking, using the computer, a subsequent attempt by the executing source application to display a subsequent pop-up on the client;
  - tracking, using the computer, executable code produced by the executing source application to identify one or more new code modules on the client as originating from the source application; and
  - blocking, using the computer, attempts by the new code modules to display a new pop-up on the client.

14. The computer program product of claim 13, wherein determining a reputation associated with the source application comprises querying a reputation server for a reputation score associated with the source application.

15. The computer program product of claim 14, wherein the reputation score is based at least in part on interactions of a plurality of client systems in a community with the source application.

16. The computer program product of claim 14, wherein the reputation score is based at least in part on hygiene scores of a plurality of client systems that use the source application, the hygiene scores indicating propensities of the clients using the source application for getting infected by malicious code.

17. The computer program product of claim 13, wherein prompting a user to provide feedback about the pop-up comprises displaying an alert window simultaneously with the pop-up, the alert window comprising an interface for a user to provide positive or negative feedback about the pop-up.

18. The computer program product of claim 13, wherein the medium further contains computer program code for:
after declaring the source application to be malicious software, removing the source application.

19. The computer program product of claim 13, wherein the medium further contains computer program code for:

after declaring the source application to be malicious software, preventing the source application from conducting network communications.

20. The computer program product of claim 13, wherein the medium further contains computer program code for:
adjusting the reputation of the source application in response to the feedback from the user.

21. The computer program product of claim 13, wherein the medium further contains computer program code for:
responsive to positive feedback about the pop-up, storing an indication that the source application is trusted software.

22. A computer program product for detecting malicious code on a client, the computer program product comprising a non-transitory computer-readable storage medium containing computer program code executable by a processor for:
detecting an attempt by a source application executing on the client to cause the client to display a visual element on a display of the client;
determining whether the source application is suspicious;
when the source application is determined to be suspicious, displaying an alert to a user requesting a user input indicating whether to block the source application from displaying visual elements on the display of the client;
responsive to the user input indicating whether to block the source application, storing a preference in a storage medium coupled to the client, the preference identifying the source application as a blocked application; and
responsive to the preference identifying the source application as a blocked application:
blocking, using the computer, subsequent attempts by the executing application to display subsequent visual elements on the display of the client;
tracking, using the computer, executable code produced by the executing source application to identify one or more new code modules on the client as originating from the source application; and
blocking, using the computer, attempts by the new code modules to display new visual elements on the display of the client.

23. The computer program product of claim 22, wherein blocking subsequent attempts by the executing source application to display subsequent visual elements on the display of the client comprises:
responsive to a subsequent attempt of the source application to cause the client to display a subsequent visual element on a display of the client, checking for the existence of a preference identifying the source application as a blocked application; and
if the preference exists, preventing the display of the subsequent visual element.

24. The computer program product of claim 22, wherein the visual element is a pop-up.

25. The method of claim 1, wherein the pop-up comprises a window drawn on a display of the client that includes a message to the user.

26. The method of claim 1, wherein the reputation is based on a number of other users who use the source application.

* * * * *